United States Patent
Nijim et al.

(10) Patent No.: US 10,448,080 B1
(45) Date of Patent: Oct. 15, 2019

(54) PAIRING AND CORRELATING MOBILE DEVICES TO PROVIDE A PERSONALIZED USER EXPERIENCE

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/243,841

(22) Filed: Apr. 2, 2014

(51) Int. Cl.
| | |
|---|---|
| *H04N 21/41* | (2011.01) |
| *H04N 21/61* | (2011.01) |
| *H04N 21/4627* | (2011.01) |
| *H04W 12/00* | (2009.01) |
| *H04N 21/422* | (2011.01) |
| *H04N 21/414* | (2011.01) |

(52) U.S. Cl.
CPC ... *H04N 21/4126* (2013.01); *H04N 21/41407* (2013.01); *H04N 21/42208* (2013.01); *H04N 21/4627* (2013.01); *H04N 21/6131* (2013.01); *H04N 21/6181* (2013.01); *H04W 12/00* (2013.01)

(58) Field of Classification Search
CPC .......... H04N 21/414; H04N 21/41407; H04N 21/41; H04N 21/4126; H04N 21/4627; H04N 21/6131; H04N 21/6181; H04N 21/42208; H04W 12/00

USPC .................................................. 725/133, 141
See application file for complete search history.

(56) References Cited

U.S. PATENT DOCUMENTS

| | | | | |
|---|---|---|---|---|
| 8,495,686 | B2 * | 7/2013 | Maddali | H04N 21/4126 709/219 |
| 8,538,333 | B2 * | 9/2013 | Jain | H04W 4/80 455/41.2 |
| 8,863,185 | B2 * | 10/2014 | Stinson, III | H04N 5/44543 725/37 |
| 9,591,680 | B2 * | 3/2017 | Kim | H04W 76/14 |

(Continued)

OTHER PUBLICATIONS

U.S. Appl. No. 14/207,239, filed Mar. 12, 2014 entitled "Pairing Wireless Set-Top Box With a Wired Set-Top Box".

(Continued)

*Primary Examiner* — James R Sheleheda
(74) *Attorney, Agent, or Firm* — Merchant & Gould

(57) ABSTRACT

Pairing between mobile devices and set-top boxes of the same household may be provided such that set-top box may be automatically configured to the mobile user's preferences. This enables seamless sharing of content between various devices and personalized user experience. When a mobile device is identified as entering the household or use location, the set-top box sends a signal which may then be broadcasted. The mobile device may then pick up the signal when it is in close proximity of the set-top box and start the pairing and provide personalized user experience. Once the mobile device has been paired with the set-top box, every time the user of that mobile device comes close to the paired set-top box, it may seamlessly be paired again to provide personalized user experience. Targeted/personalized advertising may also be inserted.

16 Claims, 6 Drawing Sheets

(56) References Cited

U.S. PATENT DOCUMENTS

| | | | |
|---|---|---|---|
| 9,736,541 B1* | 8/2017 | Nijim | H04N 21/4751 |
| 10,057,700 B2* | 8/2018 | Proctor, Jr. | H04N 5/268 |
| 10,142,668 B1* | 11/2018 | Nijim | H04N 21/4104 |
| 2006/0046709 A1 | 3/2006 | Krumm | |
| 2007/0271387 A1* | 11/2007 | Lydon | G06F 1/3209 |
| | | | 709/230 |
| 2008/0155634 A1 | 6/2008 | Khedouri et al. | |
| 2009/0239587 A1* | 9/2009 | Negron | G06F 3/04883 |
| | | | 455/566 |
| 2009/0268754 A1* | 10/2009 | Palm | H04L 67/2823 |
| | | | 370/466 |
| 2010/0040029 A1* | 2/2010 | Doppler | H04W 28/18 |
| | | | 370/338 |
| 2010/0043056 A1* | 2/2010 | Ganapathy | H04W 12/06 |
| | | | 726/2 |
| 2010/0154018 A1* | 6/2010 | Cho | H04N 21/235 |
| | | | 725/111 |
| 2010/0330979 A1* | 12/2010 | Harris | H04M 1/72533 |
| | | | 455/420 |
| 2011/0010734 A1* | 1/2011 | Newell | H04N 21/4181 |
| | | | 725/31 |
| 2011/0273625 A1* | 11/2011 | McMahon | H04N 21/2407 |
| | | | 348/734 |
| 2011/0314153 A1 | 12/2011 | Bathiche | |
| 2012/0086563 A1* | 4/2012 | Arling | G06F 3/0486 |
| | | | 340/12.52 |
| 2012/0202459 A1 | 8/2012 | Martell et al. | |
| 2012/0223132 A1* | 9/2012 | Lim | H04N 1/2755 |
| | | | 235/375 |
| 2012/0317489 A1* | 12/2012 | Kuulusa | G06F 3/04883 |
| | | | 715/733 |
| 2012/0324076 A1* | 12/2012 | Zerr | H04W 4/21 |
| | | | 709/223 |
| 2013/0175333 A1* | 7/2013 | Gilbert | H04N 21/41407 |
| | | | 235/375 |
| 2013/0288604 A1* | 10/2013 | Chang et al. | 455/41.2 |
| 2013/0316649 A1* | 11/2013 | Newham | H04W 88/04 |
| | | | 455/41.2 |
| 2013/0347117 A1* | 12/2013 | Parks | H04L 63/08 |
| | | | 726/26 |
| 2014/0028918 A1* | 1/2014 | Kim | H04N 5/4403 |
| | | | 348/564 |
| 2014/0113557 A1* | 4/2014 | Jain | H04W 48/04 |
| | | | 455/41.2 |
| 2014/0181886 A1* | 6/2014 | Goodman et al. | 725/133 |
| 2014/0229975 A1* | 8/2014 | Bolden | H04N 21/4126 |
| | | | 725/32 |
| 2014/0259047 A1* | 9/2014 | Bakar | H04N 21/6371 |
| | | | 725/30 |
| 2014/0273859 A1* | 9/2014 | Luna et al. | 455/41.3 |
| 2014/0364060 A1* | 12/2014 | Srivatsa et al. | 455/41.2 |

OTHER PUBLICATIONS

U.S. Official Action dated Nov. 25, 2014 in U.S. Appl. No. 14/207,239, 15 pgs.
U.S. Official Action dated Apr. 23, 2015 in U.S. Appl. No. 14/207,239, 16 pgs.
U.S. Official Action dated Oct. 2, 2015 in U.S. Appl. No. 14/207,239, 10 pgs.
U.S. Official Action dated Dec. 30, 2016 in U.S. Appl. No. 14/207,239, 16 pgs.
U.S. Final Official Action dated May 6, 2016 in U.S. Appl. No. 14/207,239, 19 pgs.
U.S. Official Action dated Jun. 8, 2017 in U.S. Appl. No. 14/207,239, 12 pgs.
Official Action dated Dec. 7, 2017 in U.S. Appl. No. 14/207,239, 12 pgs.
Official Action dated May 7, 2018 in U.S. Appl. No. 14/207,239, 12 pgs.
U.S. Notice of Allowance dated Oct. 3, 2018 in U.S. Appl. No. 14/207,239, 9 pgs.

* cited by examiner

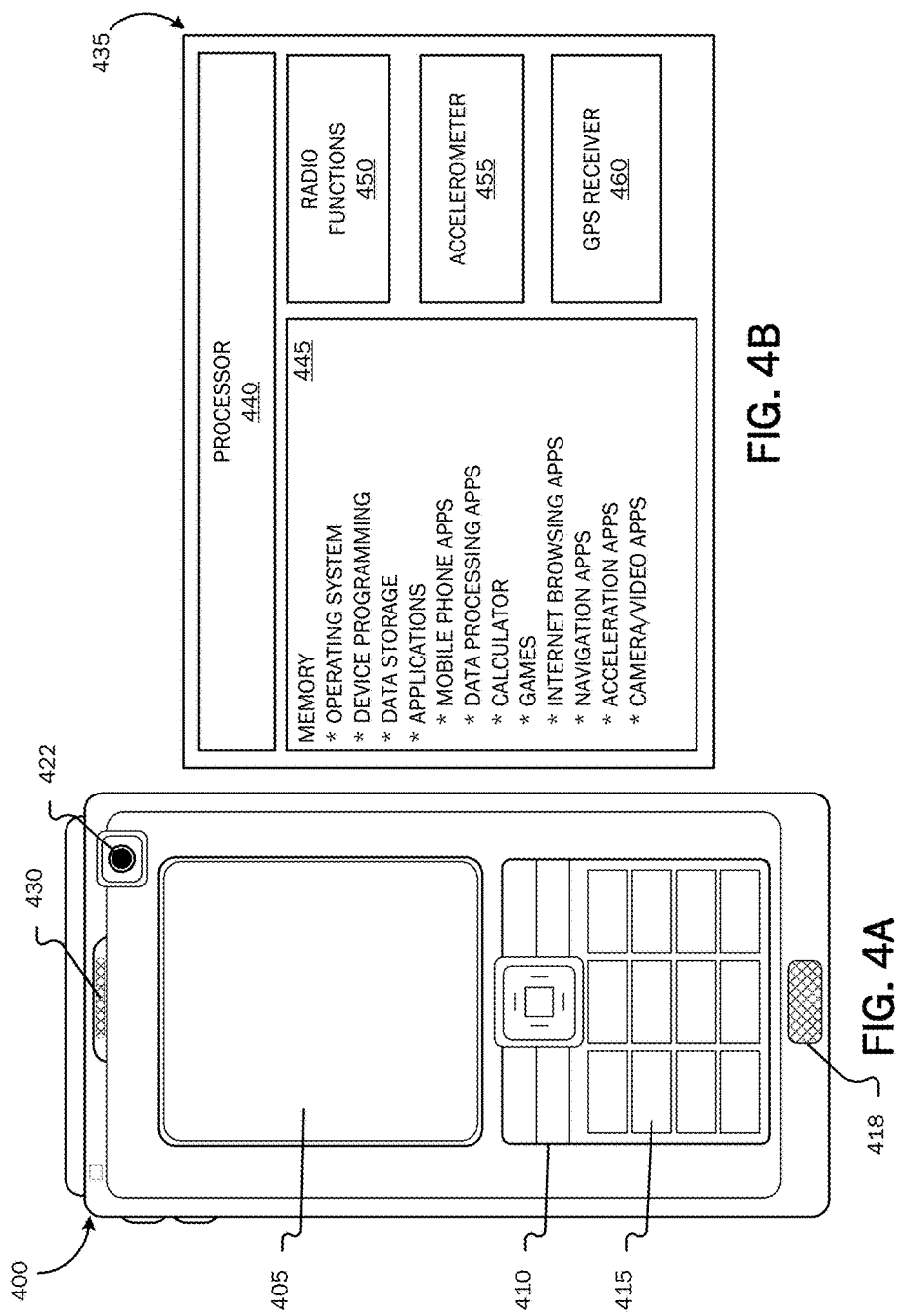

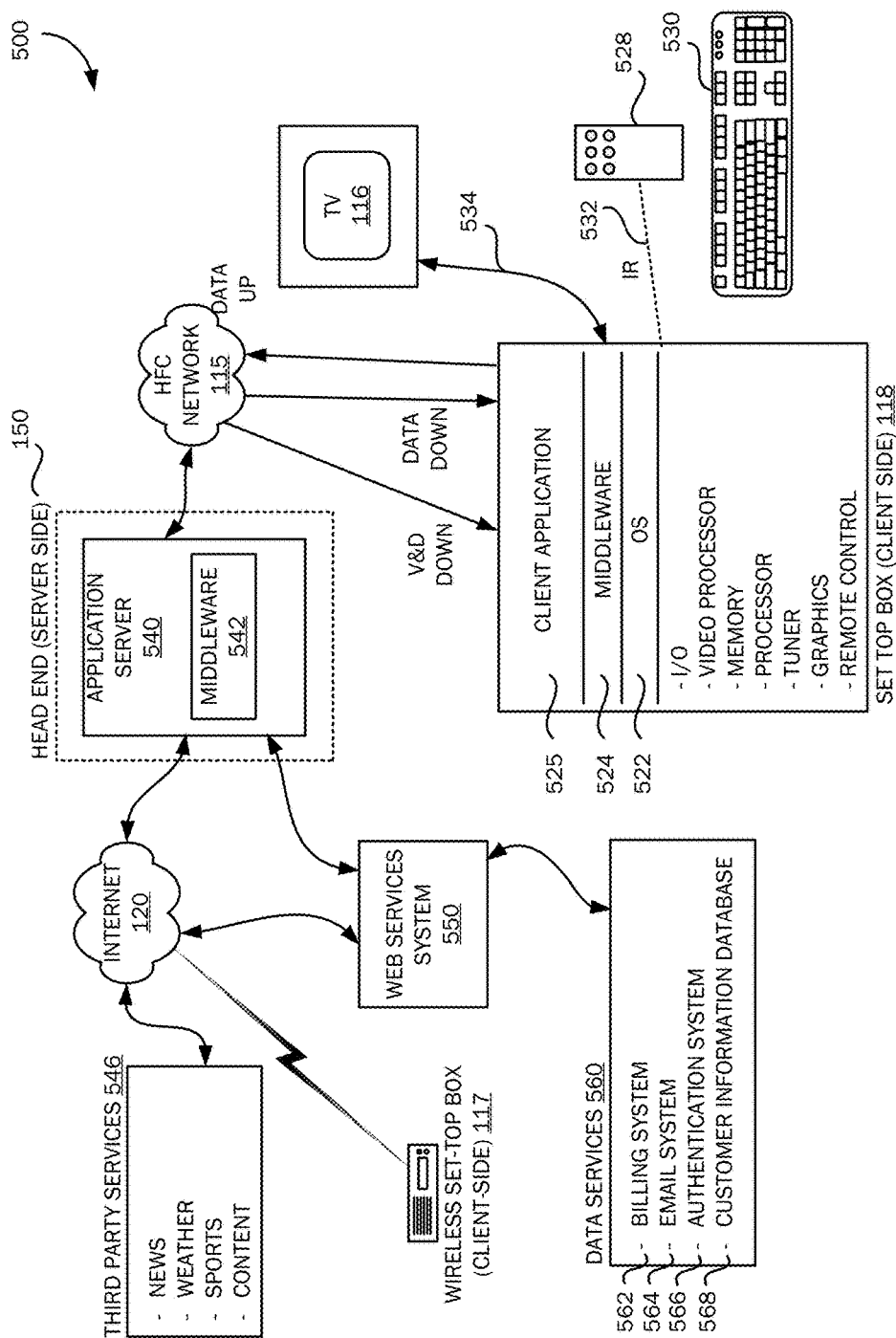

US 10,448,080 B1

PAIRING AND CORRELATING MOBILE DEVICES TO PROVIDE A PERSONALIZED USER EXPERIENCE

BACKGROUND

Video consumers today possess a plurality of devices and television (TV) sets within their households to access video content, such as hundreds of channels of linear content and thousands of pre-recorded "on-demand" movies and television shows, from cable multiple systems operators (MSOs), telephone companies (telcos), and satellite video providers. As video consumers access video content on their various devices, they desire to switch content viewing from one device to another, share content from one device to another, or share content with family and friends. However, switching/sharing may either require logging in and out of various devices multiple times or transferring/sharing data via email or external drives etc.

It is with respect to these and other considerations that the present invention has been made.

SUMMARY

Embodiments of the present invention provide pairing and correlating of mobile devices with set-top boxes. When a user enters his subscribed household or use location, assuming he carries his mobile device with him, embodiments may be utilized such that the set-top box, residing at the subscribed household or use location may send a signal, which may be broadcasted on the home network. The mobile device may then pick up the signal when it is in close proximity of the set-top box and start the pairing procedure. Once the mobile device has been paired with the set-top box, every time the user of that mobile device comes close to the paired set-top box, it may seamlessly be paired again to provide personalized user experience on the set-top box and/or the mobile device.

An approach utilized by embodiments of the present invention is that since most users carry a mobile device with them at all times, the pairing between user's mobile device and their set-top box may further enhance their experience as they consume video content from their various devices.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout:

FIGS. 4A-4B illustrate a suitable mobile computing environment with which embodiments may be practiced; and FIG. 5 is a block diagram illustrating a cable television services system architecture providing an operating environment according to an embodiment.

DETAILED DESCRIPTION

Figure 1:
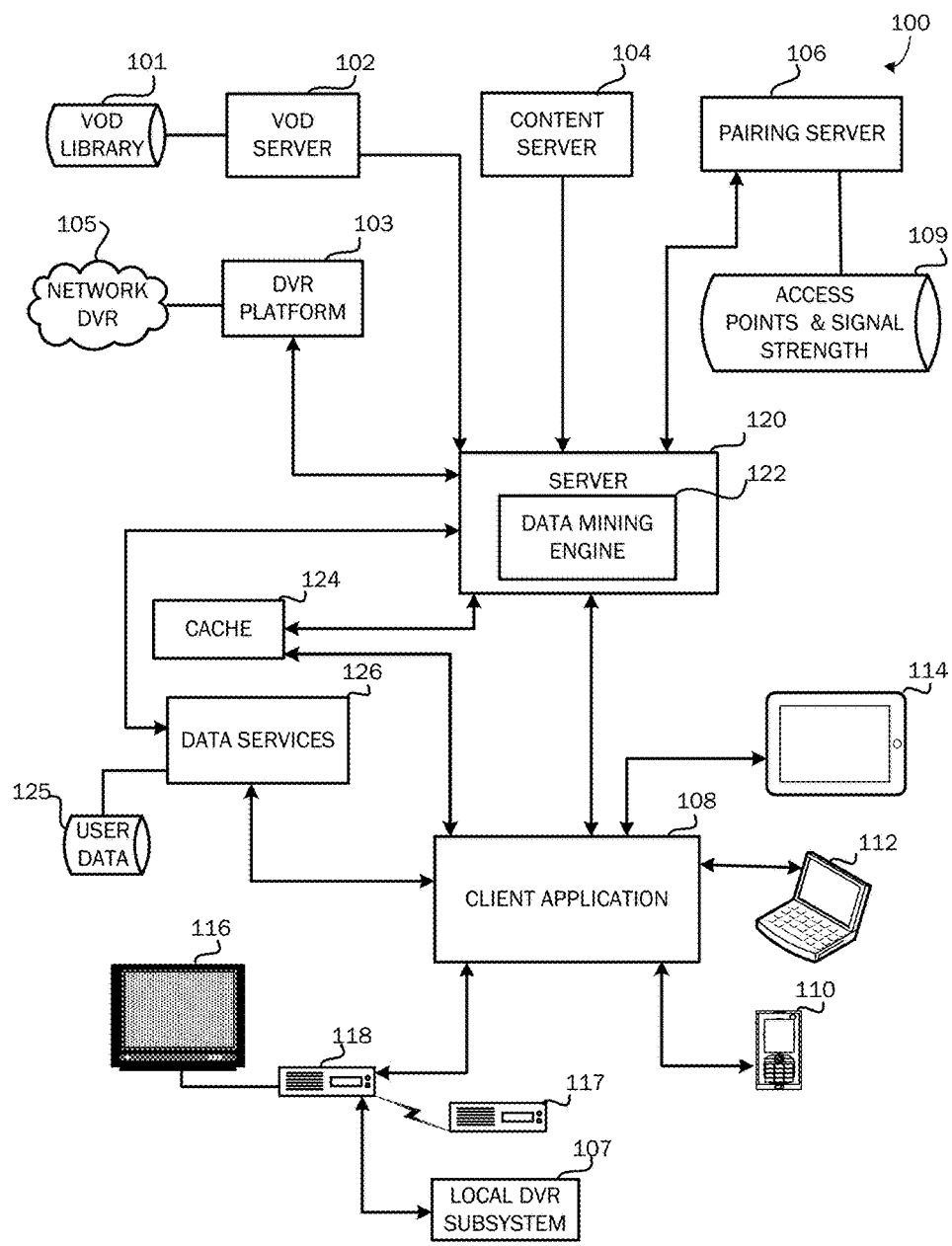
FIG. 1 is a block diagram illustrating a system for pairing and correlating of mobile devices with set-top boxes, according to an embodiment.

As briefly described above, embodiments of the present invention provide pairing and correlating of mobile devices with set-top boxes. For example, when a user enters the household or use location, assuming he carries his mobile device with him, embodiments may be utilized such that the set-top box that is within the subscribed household or use location, may send a signal, which may be broadcasted within the home network. The mobile device may then pick up the signal when it is in close proximity of the set-top box that had sent the signal. Once the mobile device has been paired with the set-top box, every time the user of that mobile device comes close to the paired set-top box, it may seamlessly be paired again to provide personalized user experience on the set-top box and/or the mobile device.

These embodiments may be combined, other embodiments may be utilized, and structural changes may be made without departing from the spirit or scope of the present invention. The following detailed description is therefore not to be taken in a limiting sense. Referring now to the drawings, in which like numerals refer to like elements throughout the several figures, embodiments of the present invention and an exemplary operating environment will be described.

FIG. 1 is a block diagram of a system 100 for providing pairing of a set-top box with a mobile device, according to an embodiment. Components of the system 100 may operate as a distributed system where each component is accessed via a network or the components may operate together as an integrated system. As illustrated, content server 104, network DVR platform 103, local DVR subsystem 107, VOD server 102 and pairing server 106 may be provided.

Content server 104 may include video content data and metadata available via a service provider, such as cable television (CATV) services system (as illustrated and described below with reference to FIG. 5), satellite television provider, or a provider on the Internet such as YouTube®, Hulu®, etc. The data and metadata may include information such as video content title, storyline, cast, genre, rating, release date, images, etc.

Pairing server 106 may comprise data and metadata related to the devices authorized to provide entitled services such as the wired/wireless STBs, and devices authorized to access the entitled services for the household subscription account with a wired connection or wirelessly, etc. According to embodiments, the pairing server 106 may also have access to the data and metadata about the various access points that may be in and around the subscriber's authorized household or use location, signal strength data within the various areas within the subscriber's authorized household or use location, the signal strength history data, the unique identifiers that identify which particular mobile device is paired with which particular set-top box etc. via an access point and signal strength database 109.

Network DVR platform 103 may comprise various DVR recordings or pointers to various DVR recordings recorded on a network DVR 105 that may be available for viewing. DVR recordings may also be stored locally via a local DVR subsystem 107 connected to a set-top box 118 in communication with a television set 116.

VOD server 102 may provide access to various VOD content items, stored either within the VOD library 101 maintained by the content provider, or the VOD content that may be available via the Internet.

VOD server 102, network DVR platform 103, pairing server 106 and content server 104 may be provided to a server 120 where a data mining engine 122 may be operable to analyze the data and metadata from the pairing server 106 in relation to the mobile device and the set-top box authorized to access services at the subscriber's authorized household or use location for performing the initial pairing and to eventually analyze every subsequent occurrence of the distance of the mobile device reaching within the preset vicinity threshold of the set-top box and ensure the seamless personalized user experience.

The associated channel/guide/content/contacts data may be cached. The cache 124 is illustrated in FIG. 1 as a remote element, but may be integrated with the server 120 or the client application 108. As new information becomes available, the associated channel/guide/content/contacts data may be updated in the cache 124.

The associated channel/guide/content data may be stored in a cache 124 located on the server 120, on the application 108, or may be located remotely and accessed via a network. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data.

As illustrated in FIG. 1, various endpoint devices may be paired with the various wired/wireless set-top boxes to provide the ease of sharing content without the need of external devices such as drives etc. or of accessing the entitled services without the hassle of manually logging in and out of devices. For example, endpoint devices may include, but are not limited to, a mobile communication device 110, such as a mobile phone, a computing device 112, such as a desktop computer, a laptop computer, etc., a wireless computing device, such as a tablet computing device 114, a television set 116, such as an Internet-connected television or a television connected to a network-connected device, such as a wired set-top box (STB) 118 or a wireless set-top box 117. An endpoint device 110,112,114, 116 may be utilized to access a client application 108. Wireless set-top box 117 may be able to connect wirelessly to one or more wired set-top boxes within a same household account to provide the entitled services to user's devices (for example: TV, mobile phone etc.).

The client application 108 may be operable to receive the information regarding when the user enters the subscribed household or use location with a mobile device. Once the set-top box sends a signal to the access point and the signal is broadcasted for the mobile device to identify and pick up the signal, the client application 108 may further be operable to identify if the mobile device that may have identified and picked up the signal sent by the set-top box, is within the preset proximity threshold. Once identified that the mobile device is within the preset proximity threshold, the client application 108 may gather the required data on the two devices that are to be paired and provide it to the server 120 wherein the data mining engine 122 may be operable to analyze the information received from the client application 108 in relation with data regarding devices capable of pairing from the pairing server 106 etc. Once the initial pairing procedure is performed, the client application 108 may further be operable to identify when the mobile device that has been paired to the set-top box comes again within the preset proximity threshold in order to seamlessly provide the user with personalized viewing experience on the set-top box and the mobile device or a mobile device application without the user having to go through the hassle of logging in and out of devices.

A designated button or other selectable control on a remote control or other suitable hard or soft key selection device may also be used to initiate the pairing function. A secondary screen companion device such as a tablet or other hand held computing device with an associated content provision application may also be used to accept input for performing the paring function. Other suitable means for performing the pairing function may include touch command, voice command, gesture command and combinations of various functionality interface methods and systems.

Figure 2A:
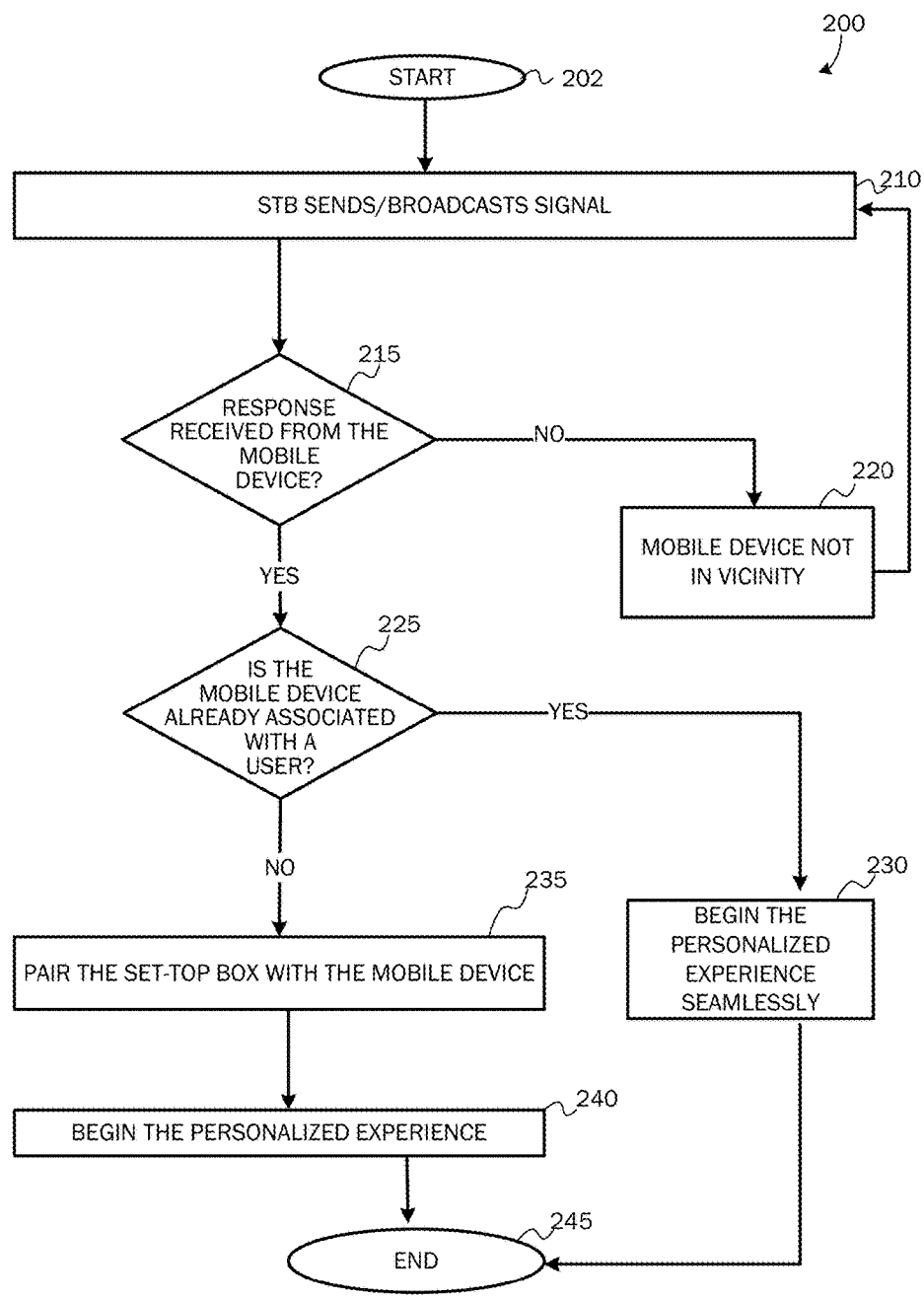
FIG. 2A-2B are flow charts of a method for providing pairing of mobile devices with set-top boxes, according to an embodiment.

FIG. 2A is a flow chart of a method 200 for pairing a mobile device with a wired/wireless set-top box, according to an embodiment. The method 200 starts at OPERATION 202 and proceeds to OPERATION 210 where the set-top box may send/broadcast a signal. The signal may be broadcasted via a plurality of mechanisms, such as via a wireless router, situated inside the subscribed household or use location. The mobile device may identify and pick up the signal when it is in close proximity of the set-top box that sent the signal. As described earlier, proximity threshold may be set at different points for different household accounts, depending on the arrangement and room sizes. The method 200 then proceeds to DECISION OPERATION 215, where a check may be performed if a response to the signal sent from the set-top box, is received by a mobile.

If at DECISION OPERATION 215, a determination is made that a response is not received from the mobile device, the method 200 proceeds to OPERATION 220 and the system concludes that the mobile device is not within the preset proximity threshold and the pairing function cannot be performed. The method 200 then goes back to OPERATION 210 where the set-top box may continue to send/broadcast a signal to the network for a mobile device to respond.

Alternatively, if at DECISION OPERATION 215, a determination is made that a response is received from the mobile device to the signal sent by the set-top box and the distance between the two devices is within the preset proximity threshold, the method 200 may proceed to another DECISION OPERATION 225 wherein a check may be performed if the said mobile device is associated with a user of the subscribed household or use location. According to an embodiment, this check may allow the system to check if the devices have already been paired previously or not.

If at DECISION OPERATION 225, a determination is made that the two devices have already been paired previously and that the said mobile device is associated with a user of the subscribed household or use location, then the method 200 may proceed to OPERATION 230 where the user may be presented with a personalized experience of the entitled services such that he may be able to share content seamlessly and efficiently or access various services without going through the hassle of logging in an out of devices.

Alternatively, if at DECISION OPERATION 225, a determination is made that the said mobile device is not associated with a user of the subscribed household or use location, or that the two devices have not already been paired previously, then the method 200 may proceed to OPERATION 235, where the pairing function may be performed. As mentioned earner, the pal ring function may be done via a plurality of mechanisms such as a Network on a chip (NOC) which is a communication subsystem on an integrated circuit or a Wi-Fi protected setup (WPS) pairing. The pairing function may be secured by password such that only an authorized user of the subscribed account may be able to perform the same.

Once the pairing function is performed, the method 200 proceeds to OPERATION 240, wherein the user may be presented with a personalized experience of the entitled services such that he may be able to share content seamlessly and efficiently or access various services without going through the hassle of logging in an out of devices.

According to embodiments, once the user leaves the room, and the distance between the two devices becomes more that the preset proximity threshold, the pairing is disconnected.

According to an embodiment, as part of the personalized viewing experience, personalized targeted advertising may also be inserted. For example, if it may be identified via the user profile information data linked to the paired mobile device that the user is a teenager, ads targeted to teenage viewers may be inserted.

The method ends at OPERATION 245.

According to another embodiment, if the system identifies multiple users with individual devices within the preset proximity threshold, user interface may be presented on the display device notifying that multiple users are available and control may be given to any one of the users after receiving a selective indication from the user interface on the display device. According to yet another embodiment, the system may be operable to automatically provide control to the user who may actively be using a subscriber application from their mobile device as a remote control.

Embodiments may also provide for presenting the personalized viewing experience based on the age appropriate content if the system may identify that the viewer is a minor based on the user profile data linked to the paired mobile device.

Figure 2B:
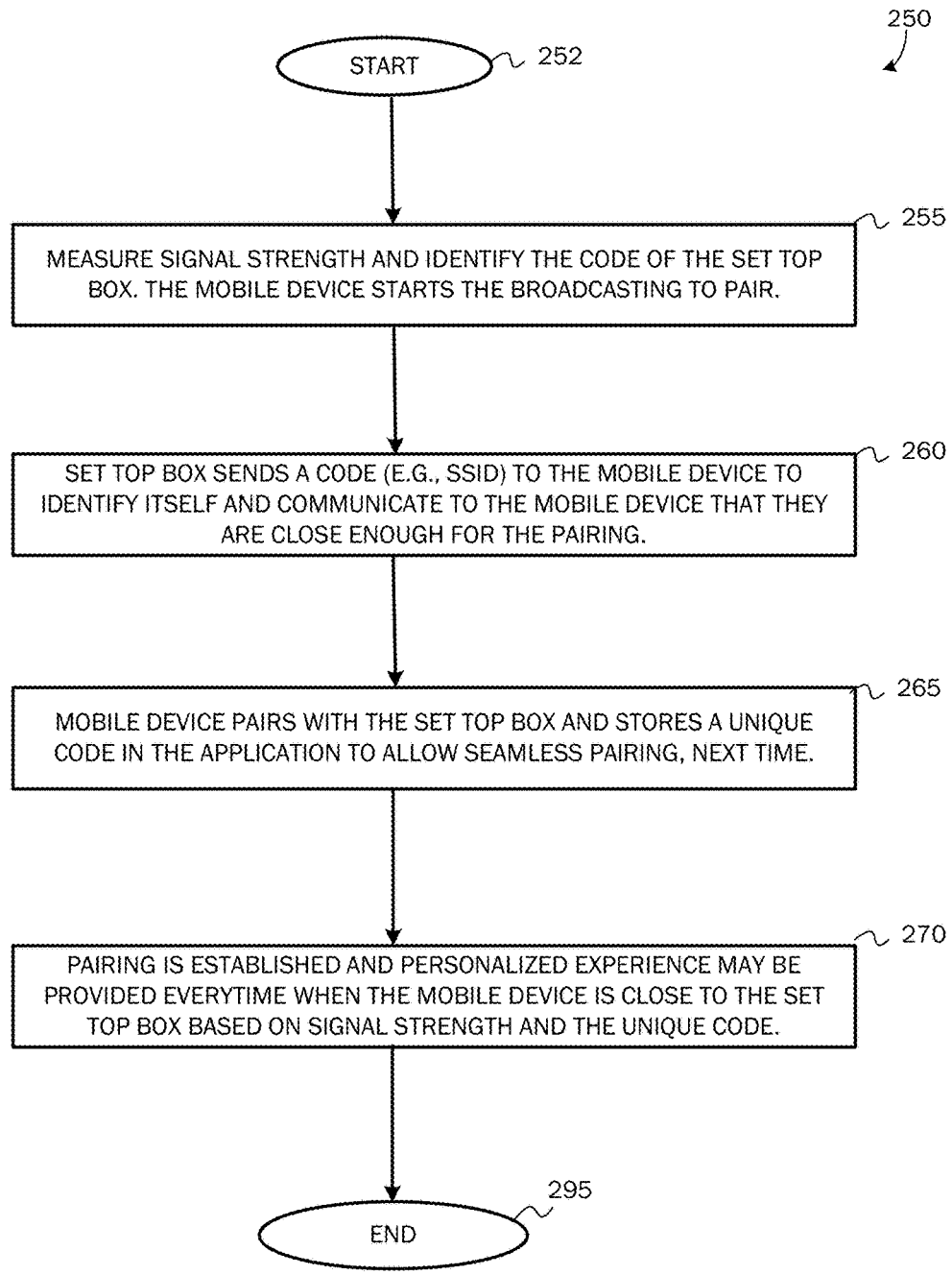

FIG. 2B is a flow chart of an example of a method 250 for pairing a mobile device with a wired/wireless set-top box, according to an embodiment. The method 250 starts at OPERATION 252 and proceeds to OPERATION 255, where the system may measure the signal strength and identify a unique code associated with the set-top box. A unique identifier, such as a service set identifier (SSID) may be created which may identify the pairing done between that particular mobile device and that specific set-top box. For example, a household account may have two set-top boxes, authorized to be used within the subscribed household or use location. If the household has three users, who carry their own mobile devices, the pairing of each mobile device with each of the set-top boxes may have its own unique identifier, assuming all three mobiles access both the set-top boxes. According to an embodiment, if a code may not be identified, a unique code may be created and assigned to the set-top box.

The method 250 proceeds to OPERATION 260 where the set-top box may send/broadcast a signal with the unique code to initiate communication with the mobile device that may come within the preset proximity of the set-top box.

Once the communication is initiated and established, the method 250 proceeds to OPERATION 265 where the pairing function may be performed and another unique code to identify the pairing of the said mobile device to the set-top box may be stored in the application 108. This allows the system to seamlessly recognize the pre-established pairing between the mobile device and the set-top box and provide the personalized experience, the next time the two devices come within the preset proximity limit, at OPERATION 270.

The method 250 ends at OPERATION 295.

Figure 3:
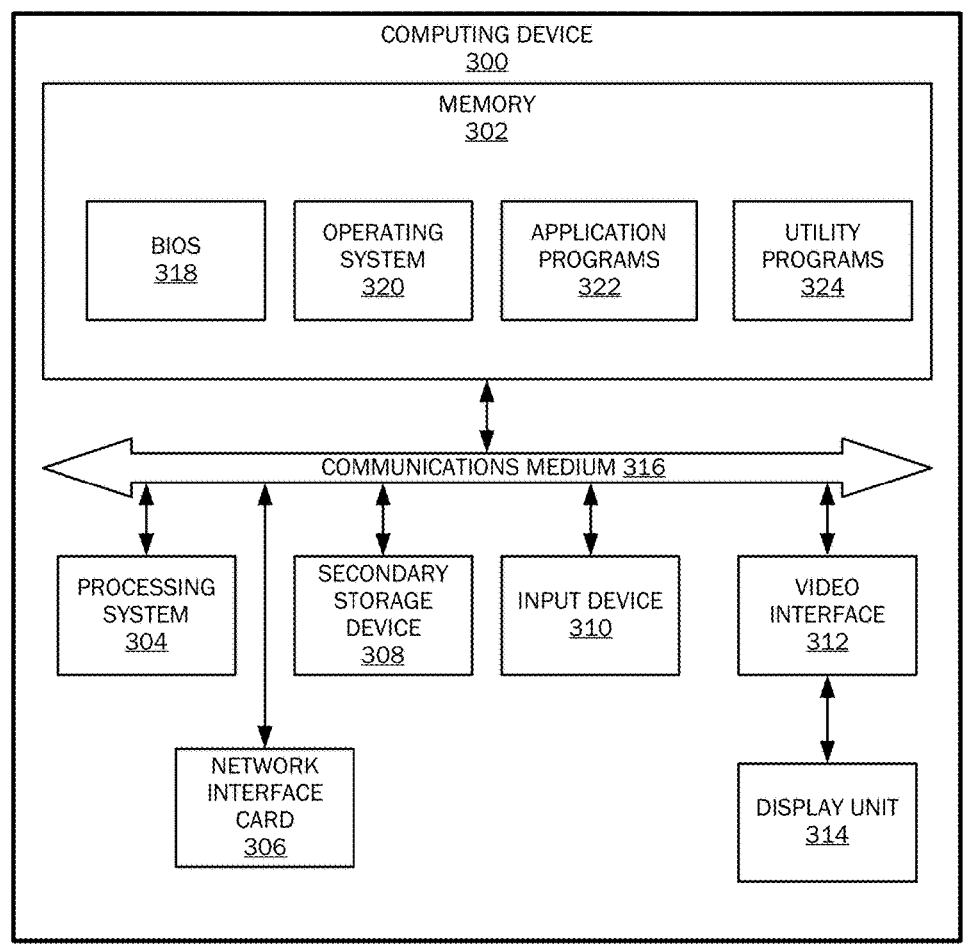
FIG. 3 is a block diagram illustrating example physical components of a computing device with which embodiments may be practiced.

FIG. 3 is a block diagram illustrating example physical components of a computing device 300 with which embodiments may be practiced. In some embodiments, one or a combination of the components of the system 100 may be implemented using one or more computing devices like the computing device 300. It should be appreciated that in other embodiments, one or a combination of the components of system 100 may be implemented using computing devices having hardware components other than those illustrated in the example of FIG. 3.

Computing devices may be implemented in different ways in different embodiments. For instance, in the example of FIG. 3, the computing device includes a processing system 304, memory 302, a network interface card 306, a secondary storage device 308, an input device 310, a video interface 312, a display unit 314, and a communications medium 316. In other embodiments, the computing device 300 may be implemented using more or fewer hardware components (e.g., a video interface, a display unit, or an input device) or in combination with other types of computer systems and program modules. The memory 302 includes one or more computer-readable media. According to one embodiment, the tuning subsystem 102, the DVR subsystem 107, and the control logic & UI may be stored locally on computing device 300. Memory 302 thus may store the computer-executable instructions that, when executed by processor 304, provide the content as described above with reference to FIGS. 1-2.

In various embodiments, the memory 302 is implemented in various ways. For example, the memory 302 can be implemented as various types of computer-readable media. According to embodiments, the term computer-readable media includes two different types of media including communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific Integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users, for example, one or more components of the substitution matching and control system 100. The memory 302 also stores one or more utility programs 324 that, when executed by the processing system 304, cause the computing device 300 to provide utilities to other software programs. Embodiments of the present invention may be utilized in various distributed computing environments where tasks are performed by remote processing devices that are linked through a communications network in a distributed computing environment.

FIGS. 4A-4B illustrate a suitable mobile computing environment, for example, a mobile computing device 400, a mobile phone/smart phone 110, a tablet/slate computer 114, a laptop/personal computer 112, and the like, with which embodiments may be practiced. The mobile computing device 400 is illustrative of any suitable device operative to send, receive and process wireless communications according to embodiments of the present invention. A display screen 405 is operative for displaying a variety of information such as information about incoming and outgoing communications, as well as, a variety of data and displayable objects, for example, text, alphanumeric data, photographs, and the like.

Data input to the device 400 may be performed via a variety of suitable means, such as, touch screen input via the display screen 405, keyboard or keypad input via a data entry area 410, key input via one or more selectable buttons or controls 415, voice input via a microphone 418 disposed on the device 400, photographic input via a camera 422 functionality associated with the mobile computing device, or any other suitable input means. Data may be output via the device 400 via any suitable output means, including but not limited to, display on the display screen 405, audible output via an associated speaker 430 or connected earphone system, vibration module for providing tactile output, and the like.

Referring now to FIG. 4B, operational unit 435 is illustrative of internal operating functionality of the mobile computing device 400. A processor 440 is illustrative of a general purpose computer processor for processing incoming and outgoing data and communications and controlling operation of the device and associated software applications via a mobile computing device operating system. Memory 445 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the system 100 may be stored locally on mobile computing device 400.

Mobile computing device 400 may contain an accelerometer 455 for detecting acceleration, and can be used to sense orientation, vibration, and/or shock. Mobile computing device 400 may contain a global positioning system (GPS) receiver (e.g., GPS send/receive functionality) 460. A GPS system uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 450 include all required functionality, including onboard antennae, for allowing the device 400 to communicate with other communication devices and systems via a wireless network. Radio functions 450 may be utilized to communicate with a wireless or Wi-Fi-based positioning system to determine a location of device 400.

FIG. 5 is a block diagram illustrating a cable television services system 500 (hereafter referred to as "CATV") architecture providing an operating environment according to an embodiment. As can be appreciated, a CATV architecture is but one of various types of systems that may be utilized to provide substituted VOD content. Referring now to FIG. 5, digital and analog video programming, information content and interactive television services are provided via a hybrid fiber coax (HFC) network 115 to a television set 116 for consumption by a cable television/services system customer. As is known to those skilled in the art, HFC networks 115 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 115 allows for efficient bidirectional data flow between the client-side set-top box 118/117 and a server-side application server 540.

The CATV system 500 is in the form of a distributed client-server computing system for providing video and data flow across the HFC network 115 between server-side services providers (e.g., cable television/services providers) via a server-side head end 150 and a client-side customer via a client-side set-top box (STB) 118 functionally connected to a customer receiving device, such as the television set 116. As is understood by those skilled in the art, modern CATV systems 500 may provide a variety of services across the HFC network 115 including traditional digital and analog video programming, telephone services, high speed Internet access, video-on-demand, and information services.

On the client side of the CATV system 500, digital and analog video programming and digital and analog data are provided to the customer's television set 116 via the set-top box (STB) 118/117. Interactive television services that allow a customer to input data to the CATV system 500 likewise are provided by the STB 118. As illustrated in FIG. 5, the STB 118/117 is a multipurpose computing device having a computer processor, memory, and an input/output mechanism. The input/output mechanism receives input from server-side processes via the HFC network 115 and from customers via input devices such as the remote control device 528, keyboard 530, or other computing device, such as a tablet/slate computer 114, mobile phone/smart phone 110, etc. The remote control device 528 and the keyboard 530 may communicate with the STB 118 via a suitable communication transport such as the infrared connection 532. The STB 118 also includes a video processor for processing and providing digital and analog video signaling to the television set 116 via a cable communication transport 534. A multi-channel tuner is provided for processing video and data to and from the STB 118 and the server-side head end system 150, described below.

The STB 118 also includes an operating system 522 for directing the functions of the STB 118 in conjunction with a variety of client applications 525. For example, if a client application 525 requires a news flash from a third-party news source to be displayed on the television set 116, the operating system 522 may cause the graphics functionality and video processor of the STB 118, for example, to output the news flash to the television set 116 at the direction of the client application 525 responsible for displaying news items. According to embodiments, the operating system 522 may include one or more components of system 100 as described herein.

Because a variety of different operating systems 522 may be utilized by a variety of different brands and types of set-top boxes, a middleware layer 524 may be provided to allow a given software application to be executed by a variety of different operating systems. According to an embodiment, the middleware layer 524 may include a set of application programming interfaces (APIs) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 118. The middleware layer 542 of the server-side application server and the middleware layer 524 of the client-side STB 118 may format data passed between the client side and server side according to the Extensible Markup Language (XML).

According to one embodiment, the set-top box 118 passes digital and analog video and data signaling to the television set 116 via a one-way communication transport 534. According to other embodiments, two-way communication transports may be utilized, for example, via high definition multimedia (HDMI) ports. The STB 118 may receive video and data from the server side of the CATV system 500 via the HFC network 115 through a video/data downlink and data via a data downlink. The STB 118 may transmit data from the client side of the CATV system 500 to the server side of the CATV system 500 via the HFC network 115 via one data uplink. The video/data downlink is an "in band" downlink that allows for digital and analog video and data signaling from the server side of the CATV system 500 through the HFC network 115 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 5, between the HFC network 115 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 540 is typically passed through the "out of band" data links. Alternatively, an "in band" data carousel may be positioned in an "in band" channel into which a data feed may be processed from the server-side application server 540 through the HFC network 115 to the client-side STB 118. Operation of data transport between components of the CATV system 500, described with reference to FIG. 5, is well known to those skilled in the art.

Referring still to FIG. 5, the head end 150 of the CATV system 500 is positioned on the server side of the CATV system and includes hardware and software systems responsible for originating and managing content for distributing through the HFC network 115 to client-side STBs 118 for presentation to customers via television sets 116. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 118 via the HFC network 115. As described above with reference to the set-top box 118, the application server 540 includes a middleware layer 542 for processing and preparing data from the head end of the CATV system 500 for receipt and use by the client-side set-top box 118. For example, the application server 540 via the middleware layer 542 may obtain data from third-party services 546 via the Internet 120 for transmitting to a customer through the HFC network 115 and the set-top box 118. For example, content metadata a third-party content provider service may be downloaded by the application server via the Internet 121. When the application server 540 receives the downloaded content metadata, the middleware layer 542 may be utilized to format the content metadata for receipt and use by the set-top box 118. Therefore, content metadata may be sent and categorized based on the availability to the customer's program guide data.

According to one embodiment, data obtained and managed by the middleware layer 542 of the application server 540 is formatted according to the Extensible Markup Language and is passed to the set-top box 118 through the HFC network 115 where the XML-formatted data may be utilized by a client application 525 in concert with the middleware layer 524, as described above. As should be appreciated by those skilled in the art, a variety of third-party services data, including news data, weather data, sports data and other information content may be obtained by the application server 540 via distributed computing environments such as the Internet 120 for provision to customers via the HFC network 115 and the set-top box 118.

According to embodiments, the application server 540 obtains customer support services data, including billing data, information on customer work order status, answers to frequently asked questions, services provider contact information, and the like from data services 560 for provision to the customer via an interactive television session. As illustrated in FIG. 5, the services provider data services 560 include a number of services operated by the services provider of the CATV system 500 which may include data on a given customer.

A billing system 562 may include information such as a customer's name, street address, business identification number, Social Security number, credit history, and information regarding services and products subscribed to by the customer. According to embodiments, the billing system 562 may also include billing data for services and products subscribed to by the customer for bill processing, billing presentment and payment receipt.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

Referring still to FIG. 5, web services system 550 is illustrated between the application server 540 and the data services 560. According to embodiments, web services system 550 serves as a collection point for data requested from each of the disparate data services systems comprising the data services 560. According to embodiments, when the application server 540 requires customer services data from one or more of the data services 560, the application server 540 passes a data query to the web services system 550. The web services system formulates a data query to each of the available data services systems for obtaining any required data for a requesting customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer data. The customer data obtained by the web services system is assembled and is returned to the application server 540 for ultimate processing via the middleware layer 542, as described above.

An authentication system 566 may include information such as secure user names, subscriber profiles, subscriber IDs, and passwords utilized by customers for access to network services. As should be understood by those skilled in the art, the disparate systems 562, 564, 566, 568 may be integrated or provided in any combination of separate systems, wherein FIG. 5 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method for providing pairing of a mobile device with a set-top box to provide a personalized user experience on the mobile device and/or set-top box, the method comprising:
    sending a signal that includes a unique code from the set-top box to initiate communication with the mobile device entering a use location according to an initial pairing procedure;
    determining if a response was received from the mobile device;
    if a response was not received from the mobile device, continue sending the signal with the unique code from the set-top box to initiate communication with the mobile device;
    upon receipt of a response from the mobile device within a preset vicinity threshold for the initial pairing procedure, identifying the mobile device entering the use location;
    if the mobile device has not been identified, storing a unique identifier to identify the pairing resulting from the initial pairing procedure between the mobile device and the set-top box;
    providing the personalized user experience while the mobile device is paired with the set-top box and within the preset vicinity threshold;
    determining that the distance between the mobile device and the set-top box is more than the preset vicinity threshold;
    in response to determining that the distance between the mobile device and the set-top box is more than the preset vicinity threshold, no longer pairing the mobile device and the set-top box; and
    in response to another determination that the distance between the mobile device and the set-top box is less than the preset vicinity threshold, utilizing the unique identifier from the initial pairing procedure between the mobile device and the set-top box to again pair the mobile device with the set-top box to provide the personalized user experience without requiring logging in and/or out of the set-top box and/or mobile device.

2. The method of claim 1, wherein the set-top box sends a signal via a network that communicates the unique code to the mobile device.

3. The method of claim 1 wherein the preset vicinity threshold is a maximum distance that can be between the mobile device and the set-top box to ensure that a mobile device user is in the same room as the set-top box.

4. The method of claim 1, wherein the preset vicinity threshold is based on one or more of:
    wireless connections inside an authorized use location;
    wireless connections around the authorized use location; and
    wireless hotspots in vicinity of the authorized use location.

5. The method of claim 1, further comprising:
    identifying when multiple individual devices are within the preset proximity threshold; and
    notifying, via a user interface, that multiple users are available for control of the personalized user experience.

6. The method of claim 5, further comprising assigning control to an associated user after receiving a selective indication via the user interface.

7. A system comprising a mobile device and a set-top box to provide a personalized user experience on the mobile device and/or set-top box, the system to:
    send a signal that includes a unique code from the set-top box to initiate communication with the mobile device entering a use location according to an initial pairing procedure;
    determine if a response was received from the mobile device;
    if a response was not received from the mobile device, continue to send the signal with the unique code from the set-top box to initiate communication with the mobile device;
    upon receipt of a response from the mobile device within a preset vicinity threshold for the initial pairing procedure, identify the mobile device entering the use location;
    if the mobile device has not been identified, store a unique identifier to identify the pairing resulting from the initial pairing procedure between the mobile device and the set-top box;
    provide the personalized user experience while the mobile device is paired with the set-top box and within the preset vicinity threshold;

determine that the distance between the mobile device and the set-top box is more than the preset vicinity threshold;

in response to the determination that the distance between the mobile device and the set-top box is more than the preset vicinity threshold, no longer pairing the mobile device and the set-top box; and in response to another determination that the distance between the mobile device and the set-top box is less than the preset vicinity threshold, utilize the unique identifier from the initial pairing procedure between the mobile device and the set-top box to again pair the mobile device with the set-top box to provide the personalized user experience without requiring logging in and/or out of the set-top box and/or mobile device.

8. The system of claim 7, wherein the set-top box sends a signal via a network that communicates the unique code to the mobile device.

9. The system of claim 7, wherein the preset vicinity threshold is a maximum distance that can be between the mobile device and the set-top box to ensure that a mobile device user is in the same room as the set-top box.

10. The system of claim 7, wherein the preset vicinity threshold is based on one or more of:
wireless connections inside an authorized use location;
wireless connections around the authorized use location; and
wireless hotspots in vicinity of the authorized use location.

11. The system of claim 7, further to:
identify when multiple individual devices are within the preset proximity threshold; and
notify, via a user interface, that multiple users are available for control of the personalized user experience.

12. The system of claim 11, further to assign control to an associated user after receiving a selective indication via the user interface.

13. A non-transitory computer readable storage device containing computer executable instructions which when executed by a computer perform a method for providing pairing of a mobile device with a set-top box to provide a personalized user experience on the mobile device and/or set-top box, comprising:
sending a signal that includes a unique code from the set-top box to initiate communication with the mobile device entering a use location according to an initial pairing procedure;
determining if a response was received from the mobile device;
if a response was not received from the mobile device, continue sending the signal with the unique code from the set-top box to initiate communication with the mobile device;
upon receipt of a response from the mobile device within a preset vicinity threshold for the initial pairing procedure, identifying the mobile device entering the use location;
if the mobile device has not been identified, storing a unique identifier to identify the pairing resulting from the initial pairing procedure between the mobile device and the set-top box;
providing the personalized user experience while the mobile device is paired with the set-top box and within the preset vicinity threshold;
determining that the distance between the mobile device and the set-top box is more than the preset vicinity threshold;
in response to determining that the distance between the mobile device and the set-top box is more than the preset vicinity threshold, no longer pairing the mobile device and the set-top box; and
in response to another determination that the distance between the mobile device and the set-top box is less than the preset vicinity threshold, utilizing the unique identifier from the initial pairing procedure between the mobile device and the set-top box to again pair the mobile device with the set-top box to provide the personalized user experience without requiring logging in and/or out of the set-top box and/or mobile device.

14. The computer readable storage device of claim 13, wherein the preset vicinity threshold is a maximum distance that can be between the mobile device and the set-top box to ensure that a mobile device user is in the same room as the set-top box.

15. The computer readable storage device of claim 13, further comprising:
identifying when multiple individual devices are within the preset proximity threshold; and
notifying, via a user interface, that multiple users are available for control of the personalized user experience.

16. The computer readable storage device of claim 15, further comprising assigning control to an associated user after receiving a selective indication via the user interface.

* * * * *